(12) United States Patent
Quixano Mendez et al.

(10) Patent No.: US 10,577,106 B2
(45) Date of Patent: Mar. 3, 2020

(54) SYSTEM AND METHOD FOR RESTRAINING CARGO

(71) Applicant: The Boeing Company, Chicago, IL (US)

(72) Inventors: Gabriel A. Quixano Mendez, Westminster, CA (US); Paul M. Wilde, Long Beach, CA (US); Ananthram Kota Shashidhar, Laguna Hills, CA (US); Haisan K. Trinh, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 110 days.

(21) Appl. No.: 15/692,009

(22) Filed: Aug. 31, 2017

(65) Prior Publication Data

US 2019/0061945 A1    Feb. 28, 2019

(51) Int. Cl.
*B64D 9/00* (2006.01)

(52) U.S. Cl.
CPC .................. *B64D 9/003* (2013.01)

(58) Field of Classification Search
CPC ...... B61D 45/008; B61D 45/007; B61D 3/20; B61D 3/18; B61D 17/00; B61D 3/02; B60P 7/13; B60P 1/6427; B60P 7/16; B60P 7/18; B60P 3/073; B60P 3/22; B60P 7/08
USPC ...... 410/88, 87, 82, 91, 52, 95, 9, 77, 74, 7; 105/454, 455, 422, 421, 419, 417, 414
See application file for complete search history.

(56) References Cited

U.S. PATENT DOCUMENTS

| | | | |
|---|---|---|---|
| 3,312,181 A | 4/1967 | Davidson | |
| 3,780,673 A | 12/1973 | Doyle et al. | |
| 5,000,635 A * | 3/1991 | Jensen | B60P 7/13 410/77 |
| 6,557,800 B2 | 5/2003 | Medina et al. | |
| 7,988,391 B2 | 8/2011 | Schulze | |
| 8,328,779 B2 | 12/2012 | Schulze | |
| 8,585,334 B2 | 11/2013 | Moradians et al. | |
| 9,079,665 B2 * | 7/2015 | Larson | B60P 7/08 |
| 9,242,730 B2 * | 1/2016 | Larson | B60P 7/08 |
| 2007/0063122 A1 | 3/2007 | Bowd et al. | |

(Continued)

FOREIGN PATENT DOCUMENTS

| | | |
|---|---|---|
| EP | 2 647 569 | 10/2013 |
| FR | 2 918 641 | 1/2009 |

OTHER PUBLICATIONS

European Patent Office, "Extended European Search Report," App. No. 18190438.4 (dated Jan. 28, 2019).

*Primary Examiner* — D Glenn Dayoan
*Assistant Examiner* — Sunsurraye Westbrook
(74) *Attorney, Agent, or Firm* — Walters & Wasylyna LLC

(57) ABSTRACT

An aircraft cargo restraint system includes an attenuator member fixed at two first attachment locations within a cargo storage compartment of a fuselage of an aircraft. The cargo restraint system also includes a cargo restraint configured to be coupled to the attenuator member at a second attachment location of the attenuator member, located between the two first attachment locations. The cargo restraint is configured to restrain cargo loaded on a cargo deck of the cargo storage compartment. The attenuator member is configured to deflect in response to a load applied to the attenuator member by the cargo restraint.

20 Claims, 11 Drawing Sheets

(56) References Cited

U.S. PATENT DOCUMENTS

| | | | |
|---|---|---|---|
| 2009/0016838 A1* | 1/2009 | Roberts | B60P 7/0892 |
| | | | 410/69 |
| 2009/0274532 A1* | 11/2009 | Krostue | B60P 7/0815 |
| | | | 410/105 |
| 2010/0209209 A1 | 8/2010 | Schulze | |
| 2011/0002752 A1 | 1/2011 | Roberts | |
| 2014/0252166 A1* | 9/2014 | Smith | B64C 25/56 |
| | | | 244/107 |
| 2016/0152171 A1 | 6/2016 | Boyer | |

* cited by examiner

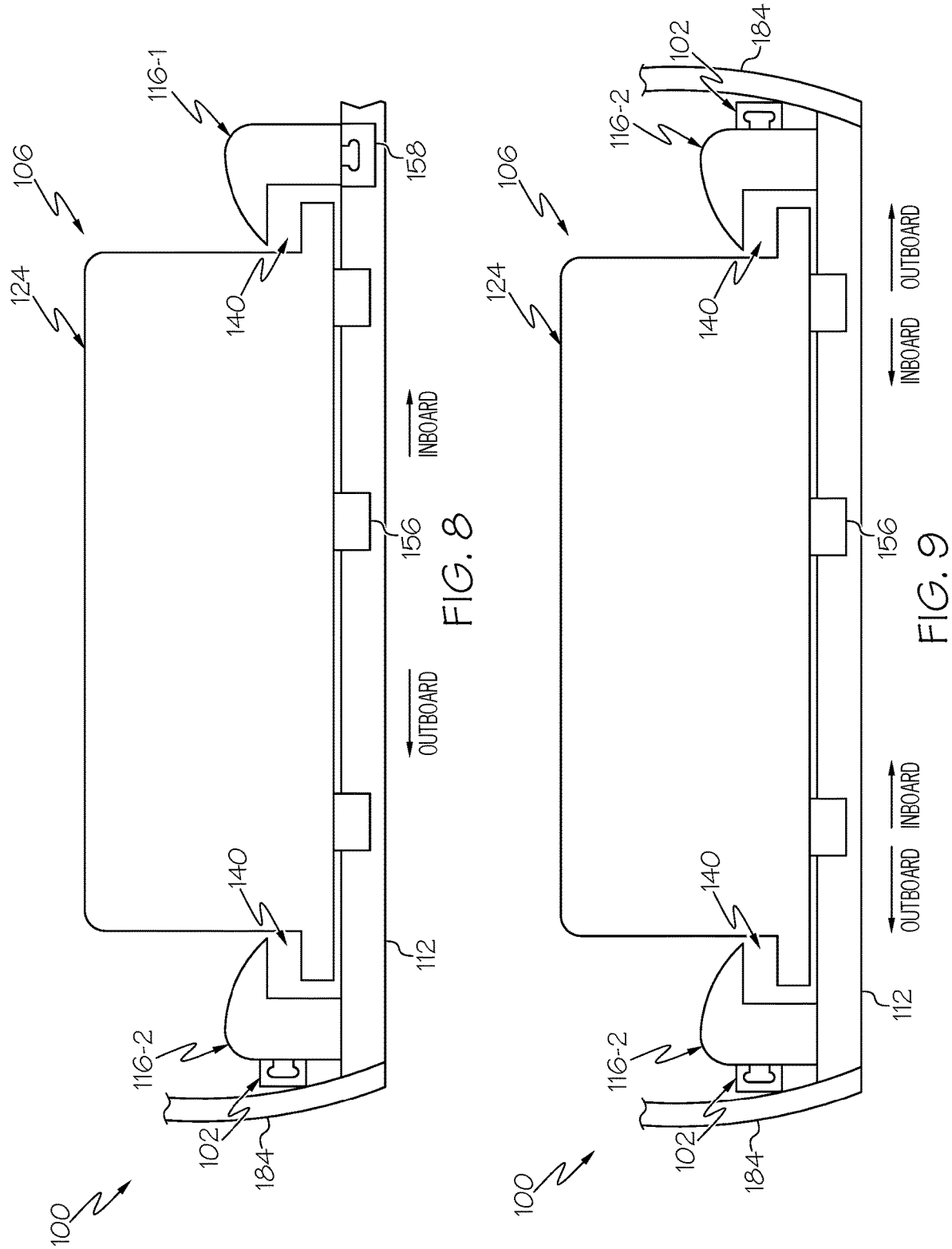

SYSTEM AND METHOD FOR RESTRAINING CARGO

FIELD

The present disclosure is generally related to cargo restraints for aircraft and, more particularly, to systems and methods for restraining cargo that compensate for distortion in the structure of the aircraft.

BACKGROUND

Aircraft typically carry cargo on pallets or in large containers called unit load devices (ULDs). ULDs and pallets are available in several different standardized lengths and widths. During flight, all ULDs and/or pallets must be securely retained to prevent damage to the aircraft and/or to the cargo and to maintain aircraft stability and balance. Accordingly, cargo restraints are used to restrain the ULDs and/or pallets in their stowed positions within an aircraft's cargo compartment. Such cargo restraints are typically mounted to an aircraft's cargo deck at fixed points that correspond to lower edges of the stowed ULD and/or pallet.

In some aircraft, deflection of the aircraft's wings during flight can cause temporary changes to the aircraft's cargo deck, particularly in the area of the aircraft's wing box. For example, typical flight loads cause upward deflection of the aircraft's wing tips, compressing the entire upper wing surface, which can affect the cargo deck, moving the left and right hand cargo restraints closer together. Because cargo restraints are designed as fixed structures that offer no flex, such lateral compression of the aircraft's cargo deck can cause stowed ULDs and/or pallets to be squeezed between their cargo restraints and can result in substantial loads on the cargo restraints and the structure of the aircraft. In extreme cases, such loads on the cargo restraints may overload the aircraft's support structure.

Attempts have been made to design cargo restraints to attenuate the damaging loads transmitted to the aircraft's support structure resulting from fixed cargo restraints squeezing the stowed ULDs and/or pallets due to deflection of the aircraft's wings. However, such attempts add undesirable complexity and cost to the cargo restraints.

Accordingly, those skilled in the art continue with research and development efforts in the field of aircraft cargo restraints.

SUMMARY

In an example, the disclosed aircraft cargo restraint system includes an attenuator member fixed at two first attachment locations within a cargo storage compartment of a fuselage of an aircraft. The cargo restraint system also includes a cargo restraint configured to be coupled to the attenuator member at a second attachment location of the attenuator member, located between the two first attachment locations. The cargo restraint is configured to restrain cargo loaded on a cargo deck of the cargo storage compartment. The attenuator member is configured to deflect in response to a load applied to the attenuator member by the cargo restraint.

In an example, the disclosed aircraft includes a fuselage including a cargo storage compartment and an aircraft cargo restraint system configured to restrain cargo within the cargo storage compartment. The cargo restraint system includes an attenuator member fixed at two first attachment locations within the cargo storage compartment. The cargo restraint system also includes a cargo restraint configured to be coupled to the attenuator member at a second attachment location of the attenuator member, located between the two first attachment locations. The cargo restraint is configured to restrain the cargo loaded on the cargo deck. The attenuator member is configured to deflect in response to a load applied to the attenuator member by the cargo restraint.

In an example, the disclosed method for restraining cargo within a cargo storage compartment of a fuselage of an aircraft includes steps of: (1) fixing an attenuator member at two first attachment locations; (2) selectively coupling a cargo restraint to the attenuator member at a second attachment location of the attenuator member, located between the two first attachment locations; (3) restraining the cargo with the cargo restraint; (4) displacing the cargo restraint in response to distortion of the cargo storage compartment; and (5) deflecting the attenuator member in response to a load applied to the attenuator member through the cargo restraint.

Other examples, embodiments or aspects of the disclosed system and method will become apparent from the following detailed description, the accompanying drawings and the appended claims.

BRIEF DESCRIPTION OF THE DRAWINGS

FIG. 8 is a schematic partial end elevation view of another example of the disclosed cargo restraint system;

FIG. 9 is a schematic end elevation view of another example of the disclosed cargo restraint system;

DETAILED DESCRIPTION

Figure 1:
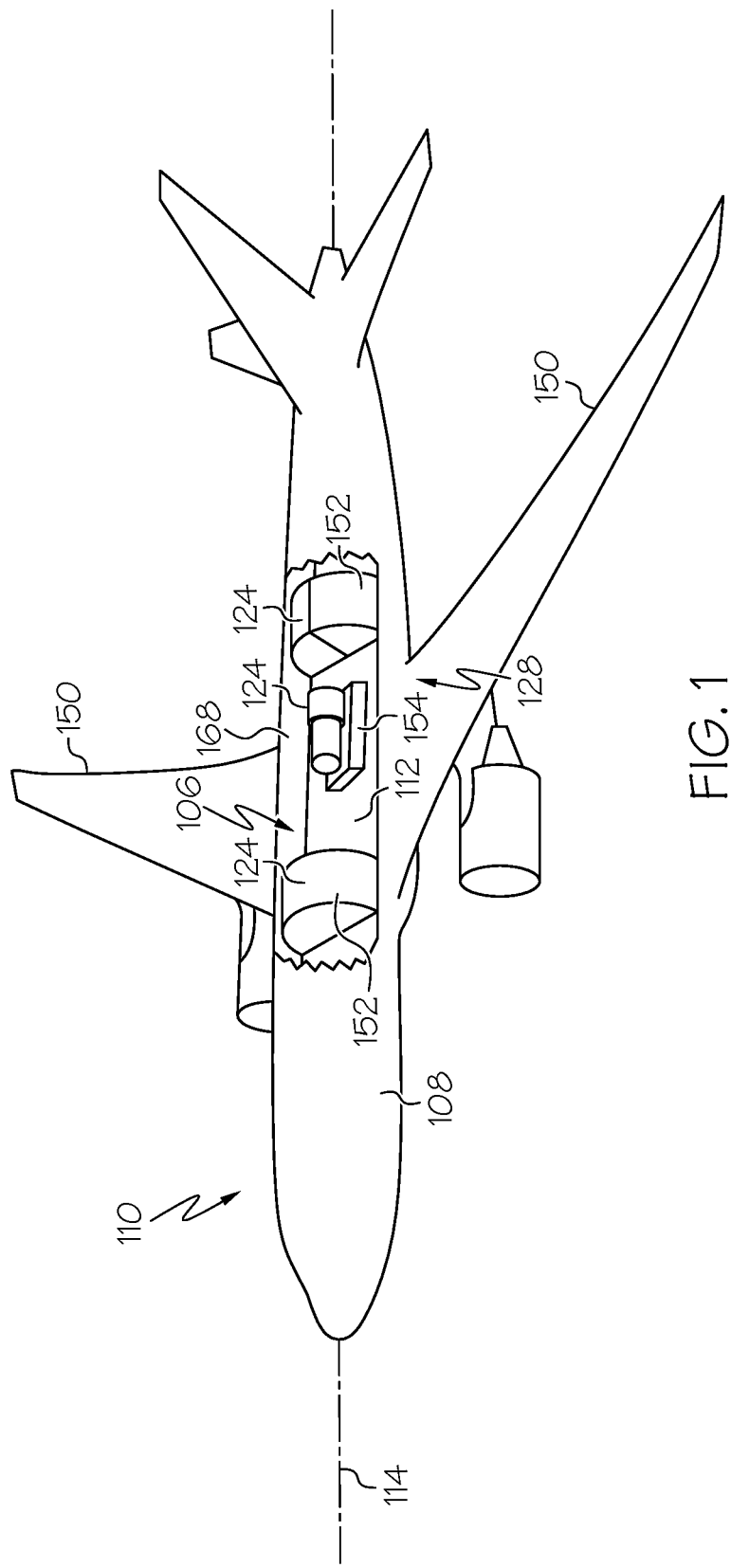
FIG. 1 is a schematic side perspective view of an example of an aircraft.

The following detailed description refers to the accompanying drawings, which illustrate specific examples and/or embodiments described by the present disclosure. Other examples and/or embodiments having different structures and/or operations do not depart from the scope of the present disclosure. Like reference numerals may refer to the same feature, element or component in the different drawings.

Illustrative, non-exhaustive examples, which may be, but are not necessarily, claimed, of the subject matter according the present disclosure are provided below.

FIG. 1 schematically illustrates an example of an aircraft 110 showing various types of cargo 124 stowed within a cargo storage compartment 106 of the aircraft 110. In FIG. 1, a portion of a wing center section 128 of a fuselage 108 of the aircraft 110 is cut away to show a portion of an interior of the cargo storage compartment 106. Cargo restraints (not shown in FIG. 1) secure the cargo 124 to a cargo deck 112 of the cargo storage compartment 106 to prevent the cargo 124 from moving during transport.

As used herein, the term "cargo" refers, generally, to the articles carried on the aircraft 110 and, particularly, to the structure in which the articles are secured to or are stored within. As an example, the cargo 124 may include a large container, referred to herein as a unit load device (ULD) 152, in which articles are stored for transport by the aircraft 110. As another example, the cargo 124 may include a flat structure, referred to herein as a pallet 154, onto which articles are secured in a stable fashion for transport by the aircraft 110.

Figure 2:
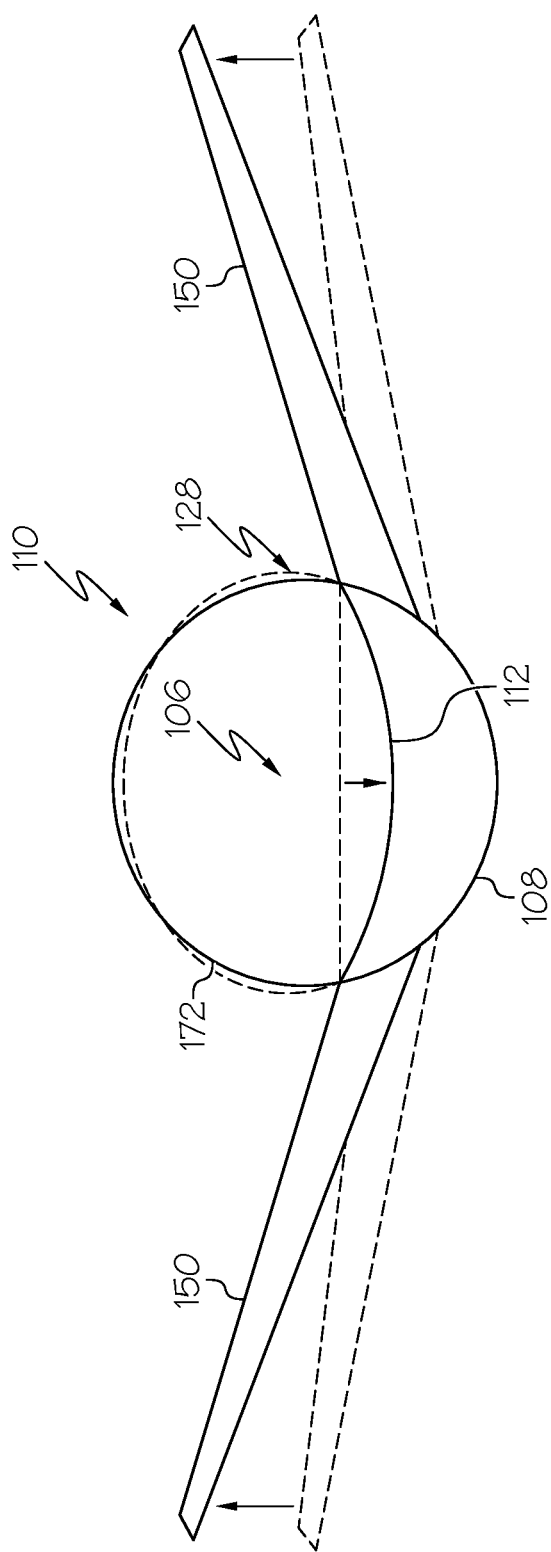
FIG. 2 is a schematic diagram of an example distortion of the aircraft as a result of upward deflection of wings of the aircraft.
Figure 4:
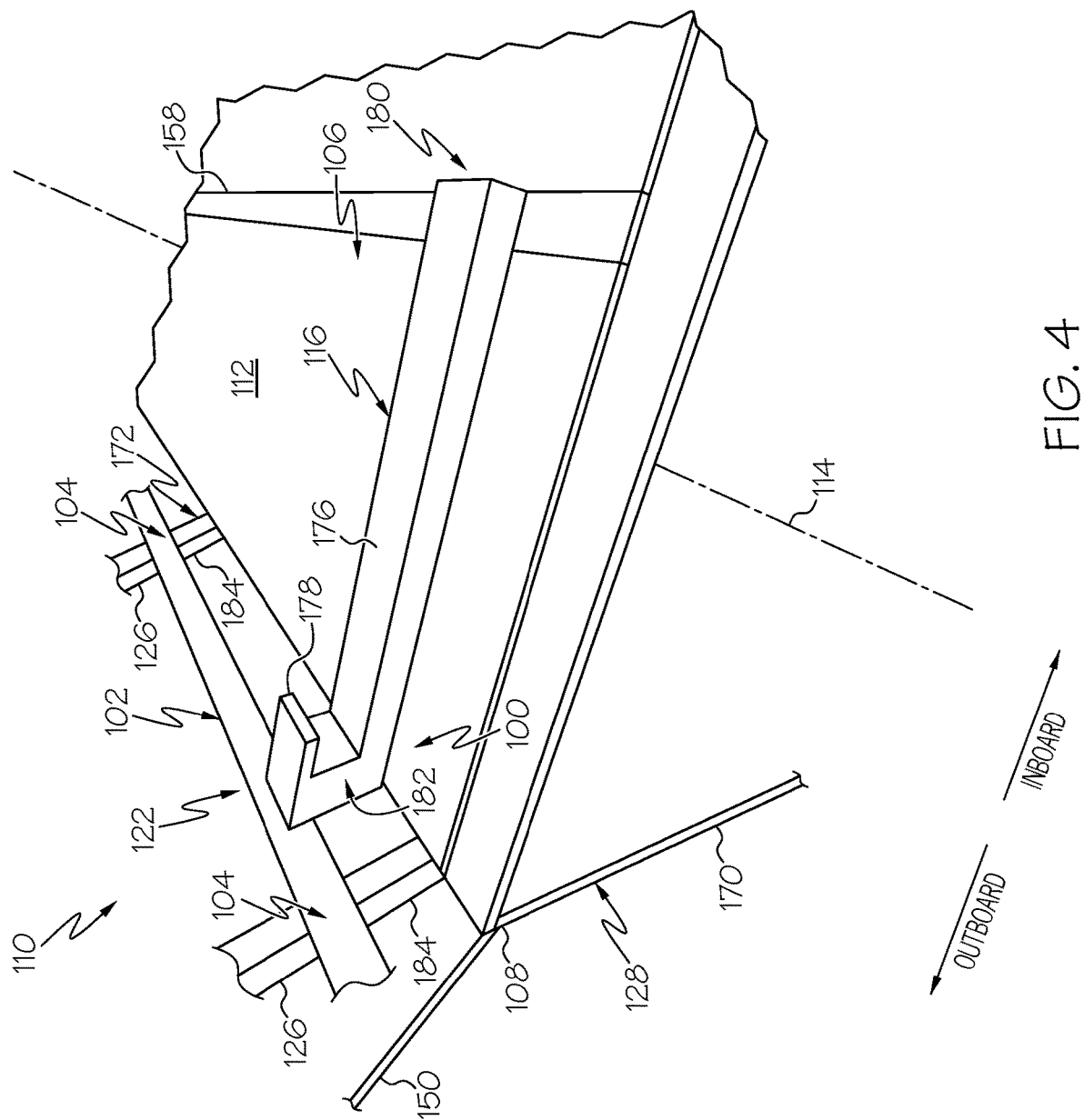
FIG. 4 is a schematic partial end perspective view of an example of the disclosed cargo restraint system.
Figure 5:
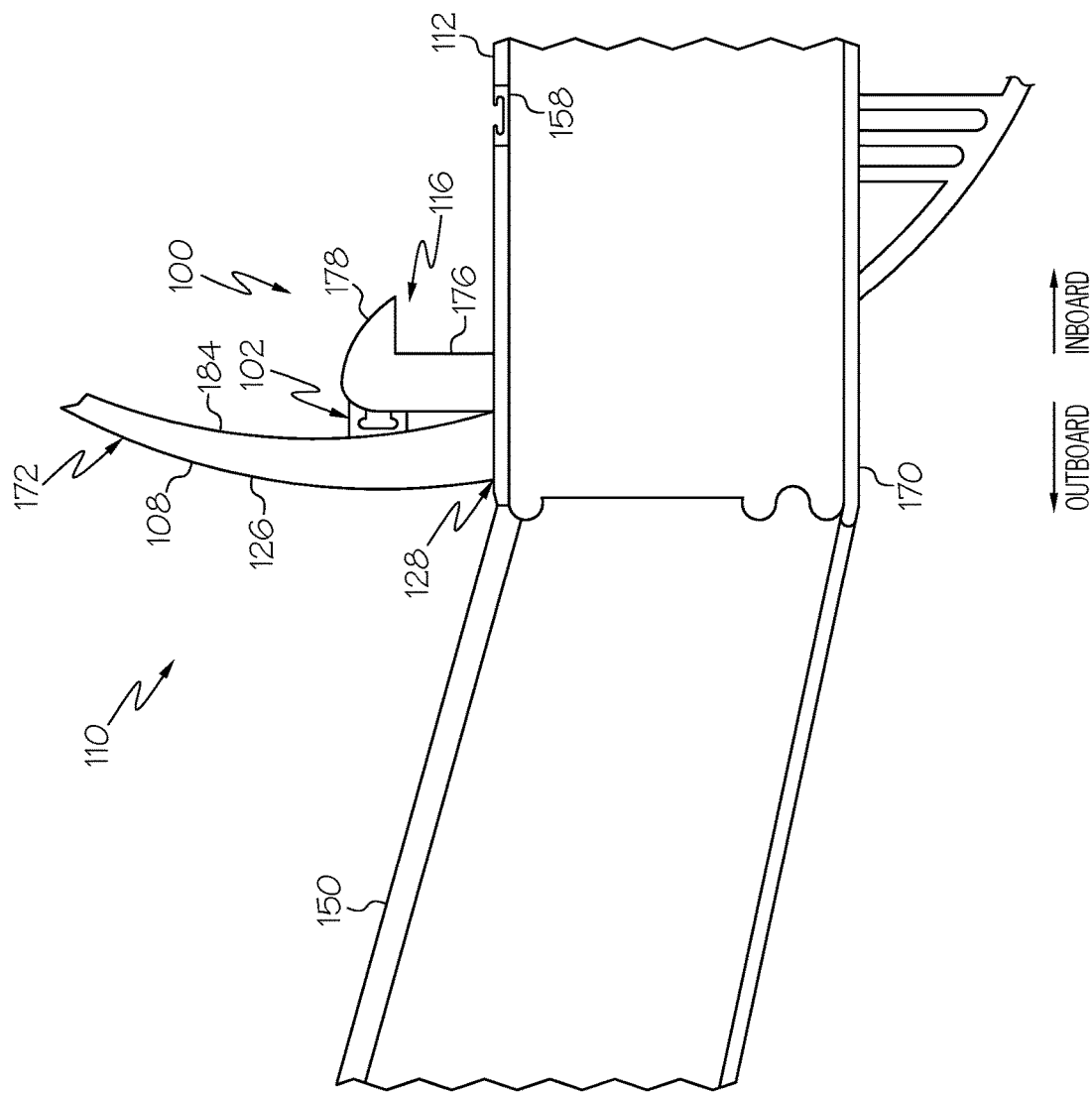
FIG. 5 is a schematic partial end elevation view of another example of the disclosed cargo restraint system.

FIG. 2 schematically illustrates an example of distortion of the aircraft 110 as a result of deflection (e.g., flexion or bending) of wings 150 of the aircraft 110 during flight or other movement (e.g., taxiing down a runway, landing, etc.). The distortion may alter the structural components of the cargo storage compartment 106 of the aircraft 110. This distortion occurs primarily within the wing center section 128 of the aircraft 110. As used herein, the wing center section 128 of the aircraft 110 includes a portion of the fuselage 108 of the aircraft 110 that includes the wing box 170 (FIGS. 4 and 5).

Generally, deflection of the wings 150 may cause lateral distortion of the aircraft 110. In an example, and as illustrated in FIG. 2, an upward deflection of the wings 150 may cause an inward lateral distortion of an airframe 172 of the aircraft 110 and may cause a concave distortion, or a downward bowing, of the cargo deck 112 on which the cargo 124 (FIG. 1) is loaded. In another example (not illustrated), a downward deflection of the wings 150 may cause an outboard lateral distortion of the airframe 172 and may cause a convex distortion, or an upward bowing, of the cargo deck 112. The amount of distortion may vary based, at least in part, on hull design, structural materials, and outside forces such as turbulence that can exert greater forces on the wings 150 to produce greater wing deflection and distortion.

Referring generally to FIGS. 3-11, disclosed herein is a cargo restraint system 100 that is configured to accommodate distortion of the cargo storage compartment 106 and attenuate damaging loads transmitted to the cargo storage compartment 106 of the aircraft 110.

Throughout the present disclosure, reference to the cargo storage compartment 106 includes the structural components of the airframe 172 forming the cargo storage compartment 106, the structural components of the cargo deck 112 of the cargo storage compartment 106, and/or the structural components of the wing box 170 located below and coupled to the cargo deck 112 of the cargo storage compartment 106. Similarly, reference to distortion of the cargo storage compartment 106 refers to distortion of the structural components of the airframe 172 forming the cargo storage compartment 106, distortion of the structural components of the cargo deck 112 of the cargo storage compartment 106, and/or distortion of the structural components of the wing box 170 located below and coupled to the cargo deck 112 of the cargo storage compartment 106 resulting from deflection of the wings 150.

Figure 6:
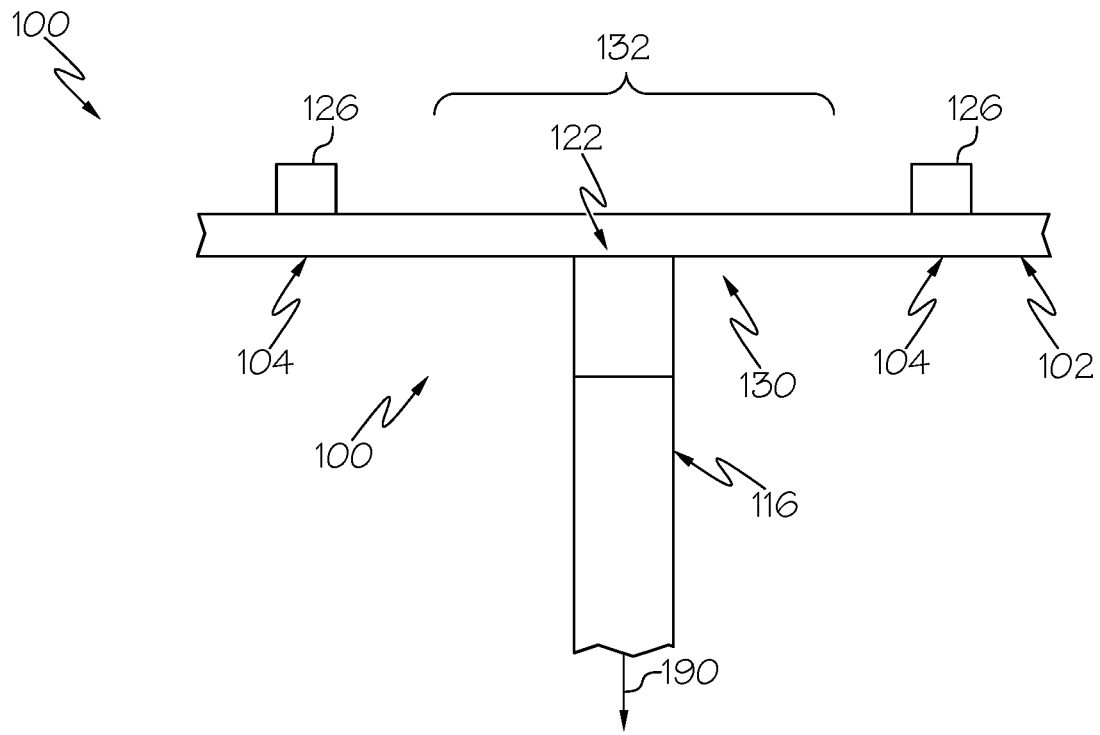
FIG. 6 is a schematic top plan view of another example of the disclosed cargo restraint system in a default position.
Figure 7:
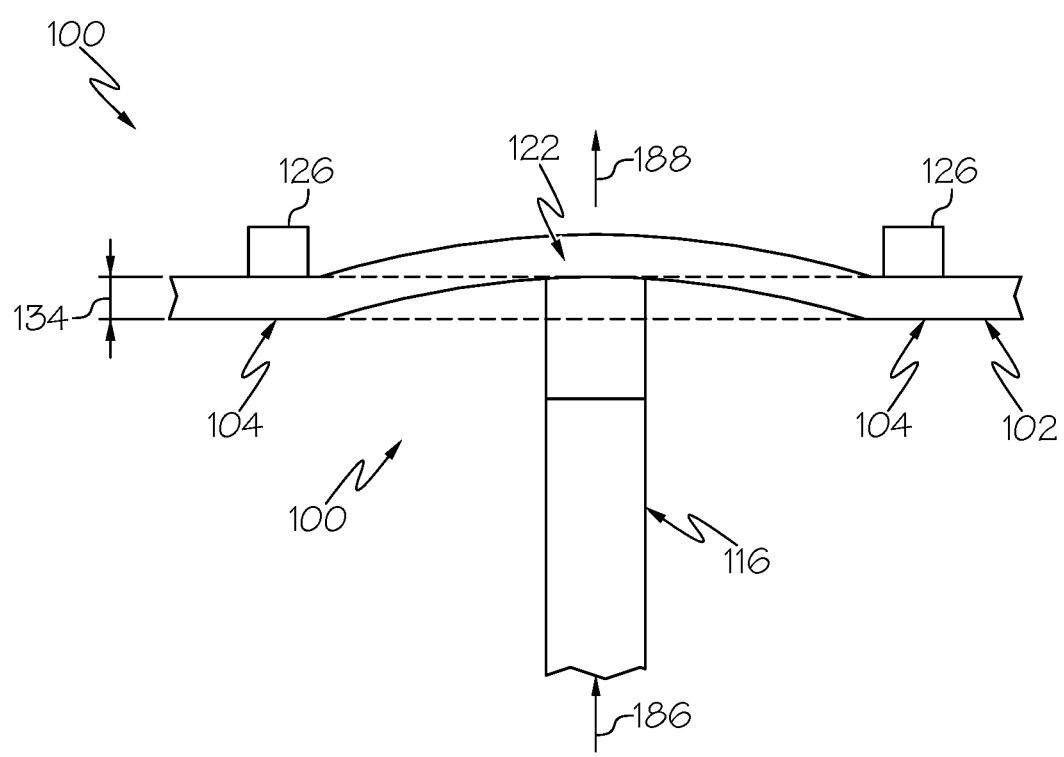
FIG. 7 is a schematic top plan view of an example of the disclosed cargo restraint system in a deflected position.

In an example, the cargo restraint system 100 includes an attenuator member 102 and at least one cargo restraint 116. The attenuator member 102 is fixed at two first attachment locations 104 (FIGS. 4, 6, 7 and 11) within the cargo storage compartment 106 of the fuselage 108 of the aircraft 110. The cargo restraint 116 is configured to be coupled to the attenuator member 102 at a second attachment location 122 (FIGS. 4, 6 and 7) of the attenuator member 102. The second attachment location 122 is located between the two first attachment locations 104. In certain examples, the cargo restraint 116 is also coupled to the cargo deck 112 of the cargo storage compartment 106 (FIG. 4). The cargo restraint 116 is configured to restrain the cargo 124 (FIGS. 3, 8 and 9) loaded on the cargo deck 112. The attenuator member 102 is configured to deflect in response to a load applied to the attenuator member 102 by the cargo restraint 116 (FIGS. 6 and 7).

Each cargo restraint 116 is configured to engage the cargo 124 (e.g., the ULD 152 or the pallet 154) to prevent the cargo 124 from movement during transport. Deflection of the attenuator member 102 attenuates, or reduces the effect of, a load transmitted to the cargo storage compartment 106 of the aircraft 110 by the cargo 124, through the cargo restraint 116, in response to distortion caused by deflection of the wings 150 of the aircraft 110. Deflection of the attenuator member 102 enables the cargo restraint 116, which is coupled to the attenuator member 102, to move in response to distortion of the cargo storage compartment 106 and absorb distortion of the cargo storage compartment 106.

Figure 3:
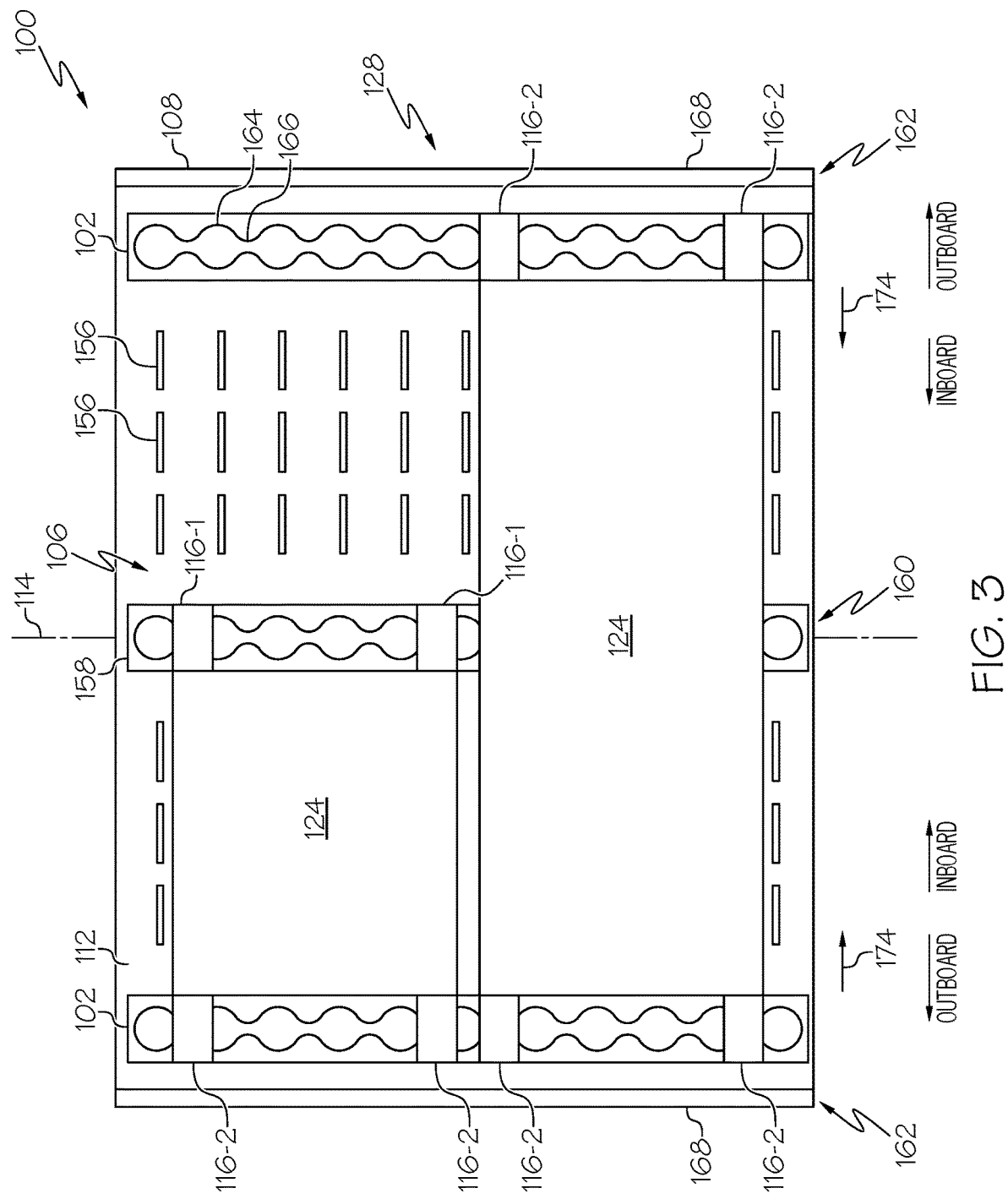
FIG. 3 is a schematic top view of an example configuration of a cargo storage compartment of the aircraft.

FIG. 3 schematically illustrates an example configuration of the cargo storage compartment 106 of the aircraft 110. In an example, multiple cargo restraints 116 are installed at points that will accommodate various types and sizes of cargo 124. As an example, one or more cargo restraints 116 may be positioned along a longitudinal center 160 of the cargo storage compartment 106, also referred to herein as center restraints 116-1. One or more cargo restraints 116 may be positioned in longitudinal rows that are parallel to and are at various distances from the centerline, also referred to herein as side restraints 116-2. As an example, the side restraints 116-2 may be located proximate to (e.g., at or near) or along a sidewall 168 of the cargo storage compartment 106.

In an example, the cargo deck 112 of the cargo storage compartment 106 also includes tracks 158. In the illustrative example of FIG. 3, one or more of the tracks 158 may be located proximate to (e.g., at or near) a longitudinal center 160 of the cargo deck 112 of the cargo storage compartment 106. One or more cargo restraints 116 may be coupled to the track 158 at desired locations. In this example, the cargo restraints 116 coupled to the track 158 are the center cargo restraints 116-1. In other examples, one or more other tracks 158 (not illustrated) may be positioned parallel to and at various distances from the center track 158.

In an example, one or more of the attenuator members 102 may be positioned parallel to and at various distances from the track 158. In the illustrative example of FIG. 3, the attenuator members 102 may be located proximate to either lateral outboard side 162 of the cargo storage compartment 106, for example, along the sidewall 168 of the cargo storage compartment 106. One or more cargo restraints 116 may be coupled to the attenuator member 102 at desired locations. In this example, the cargo restraints 116 coupled to the attenuator members 102 are the side cargo restraints 116-2.

In an example, the cargo deck 112 of the cargo storage compartment 106 also includes rollers 156. The rollers 156 may include lateral oriented rollers and/or longitudinal oriented rollers. Alternatively, the rollers 156 may include swiveling rollers that can be oriented either laterally or longitudinally as necessary. The rollers 156 are configured to eliminate much of the friction between a bottom of the cargo 124 and the cargo deck 112 of the cargo storage compartment 106, thereby enabling the cargo 124 to be repositioned with less force.

For cargo 124 that is about half as wide as the cargo storage compartment 106, the cargo 124 may be loaded and stowed such that an inboard lower edge of the cargo 124 is vertically and laterally restrained by one or more center cargo restraints 116-1 and an opposed outboard lower edge of the cargo 124 is vertically and laterally restrained by one or more side cargo restraints 116-2. For cargo 124 that is about as wide as the cargo storage compartment 106, the cargo 124 may be loaded and stowed along the aircraft's centerline such that opposed outboard lower edges of the cargo 124 are vertically and laterally restrained by opposed sets of the side cargo restraints 116-2.

In an example, the distortion phenomenon may alter the width (e.g., the lateral dimension) of the cargo deck 112 of the cargo storage compartment 106. For example, the convex distortion, or downward bowing, of the cargo deck 112 (FIG. 2) may reduce the width of the cargo deck 112. Because the cargo restraints 116 are fixed to the structure of the aircraft 110, distortion of the cargo deck 112 resulting from the upward deflection of the wings 150 (FIG. 2) may tend to cause lateral displacement (e.g., movement) of the side cargo restraints 116-2 in an inboard direction, represented by directional arrow 174, toward the longitudinal center 160 of the cargo storage compartment 106. This distortion may cause a pinching of the cargo deck 112 that results in the cargo 124 being squeezed, or pinched, between opposing cargo restraints 116.

When the distortion of the cargo storage compartment 106 creates this pinching effect, the loads of the cargo 124 may become disproportionately distributed to the longitudinal center 160 of the cargo storage compartment 106 or to the lateral outboard sides 162 of the cargo storage compartment 106. This may overload the structure of the airframe 172 forming the cargo storage compartment 106 and/or may cause fracturing or other damage to the cargo deck 112 of the cargo storage compartment 106. Distortion of the cargo storage compartment 106 may also cause the cargo restraints 116 to exert penetrating forces to the cargo 124. Sufficient penetrating forces may damage the cargo 124 by breaching or bending the outer walls of the ULD 152 or the pallet 154 (FIG. 1) or otherwise damaging the articles contained within the ULD 152 or secured on the pallet 154.

Referring to FIGS. 4 and 5, in an example, the attenuator member 102 is oriented in a first direction. As an example, the first direction of the orientation of the attenuator member 102 is substantially parallel to a longitudinal axis 114 (FIG. 4) of the fuselage 108. The cargo restraint 116 is oriented in a second direction. As an example, the second direction of the orientation of the cargo restraint 116 is substantially perpendicular to the longitudinal axis 114 of the fuselage 108 to laterally restrain the cargo 124. As another example, the second direction of the orientation of the cargo restraint 116 is substantially perpendicular to the first direction of the orientation of the attenuator member 102.

In an example, the attenuator member 102 is coupled to two attenuator support structures 184. The two attenuator support structures 184 are spaced apart from each other. The attenuator member 102 extends between the two attenuator support structures 184. The attenuator member 102 is fixed to the two attenuator support structures 184 at the two first attachment locations 104. Extending the attenuator member 102 between the two attenuator support structures 184 enables a portion of the attenuator member 102, located between the two first attachment locations, to deflect, or bend, relative to the two attenuator support structures 184 in response to a load applied to the attenuator member 102 at a location between the two first attachment locations by the cargo restraint 116.

Figure 11:
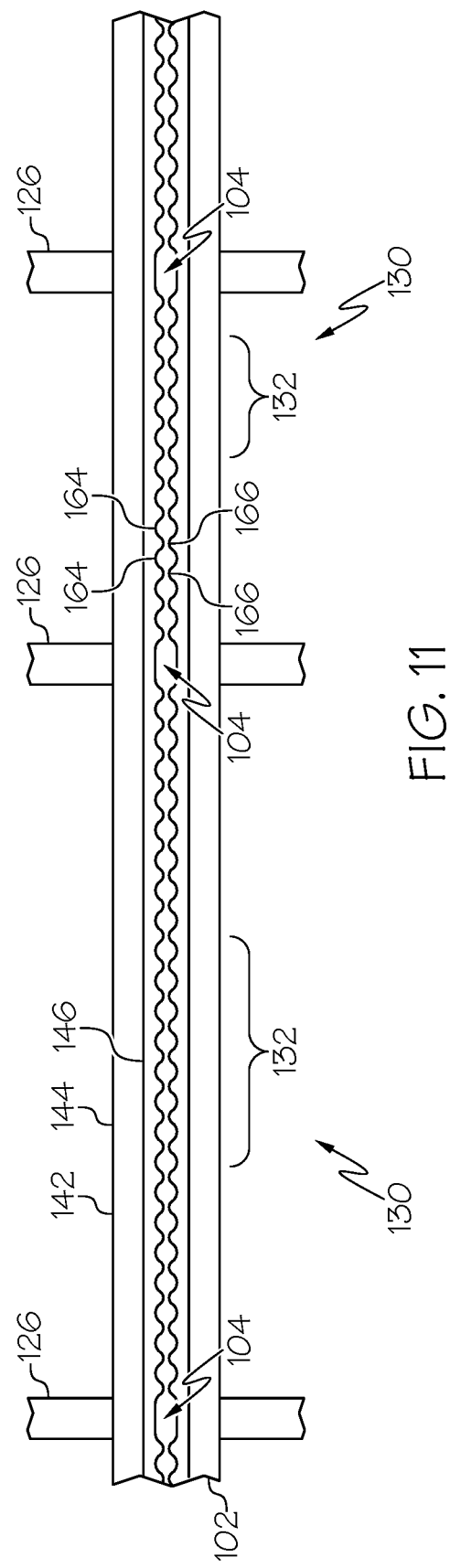
FIG. 11 is a schematic side elevation view of an example of an attenuator member of the disclosed cargo restraint system.

While the illustrative example of the cargo restraint system 100 shows the attenuator member 102 coupled to two attenuator support structures 184, in other examples, the attenuator member 102 may be coupled to more than two attenuator support structures 184. As an example, and as best illustrated in FIG. 11, the attenuator member 102 may be coupled to and extend between three or more longitudinally spaced apart attenuator support structures 184 at three or more first attachment locations 104. In this example, each portion of the attenuator member 102, located between a directly adjacent pair of first attachment locations can deflect, or bend, relative to a directly adjacent pair of attenuator support structures 184 in response to a load applied to the attenuator member 102 at a location between the directly adjacent pair of first attachment locations 104 by the cargo restraint 116.

In an example, the attenuator support structures 184 are frame sections 126 of the airframe 172 of the fuselage 108 forming the cargo storage compartment 106. As an example, the attenuator member 102 is coupled with two frame sections 126 at the two first attachment locations 104 and the attenuator member 102 extends between the two frame sections 126. For example, the frame sections 126 are part of the wing center section 128 of the fuselage 108 to which the wings 150 of the aircraft 110 are coupled.

In another example, the attenuator support structures 184 are independent structures separate from the airframe 172 of the fuselage 108. In other words, the attenuator support structures 184 do not form a portion of the primary structure of the airframe 172. As an example, the attenuator support structures 184 may be coupled to the cargo deck 112 of the cargo storage compartment 106. As another example, the attenuator support structures 184 may be coupled to the sidewall 168 (FIG. 3) of the cargo storage compartment 106.

In an example, the attenuator member 102 is positioned adjacent to the cargo deck 112 of the cargo storage compartment 106. The attenuator member 102 is not directly coupled to the cargo deck 112. As an example, the attenuator member 102 is coupled to the attenuator support structures 184 and is spaced above the cargo deck 112. The location of the attenuator member 102 relative to the cargo deck 112 enables the cargo restraint 116 to be coupled to the attenuator member 102 at a position suitable for engagement with the lower edge of the cargo 124 and enables the attenuator member 102 to deflect, or bend, relative to the attenuator support structures 184 and the cargo deck 112.

Referring to FIGS. 6 and 7, the attenuator member 102 is configured to deflect in a lateral direction, represented by directional arrow 188 (FIG. 7), in response to a lateral load 186 (FIG. 7) applied to the attenuator member 102 by the cargo restraint 116. The relative orientation of the cargo restraint 116 enables the cargo restraint 116 to vertically and laterally restrain the cargo 124 (FIG. 3) loaded on the cargo deck 112. The relative orientation of the attenuator member 102 enables the attenuator member 102 to deflect in the lateral direction in response to the lateral load 186 applied to the attenuator member 102 by the cargo restraint 116. Lateral deflection of the attenuator member 102 enables the cargo restraint 116 to move in the lateral direction 188.

FIG. 6 illustrates an example of the disclosed cargo restraint system 100 prior to distortion of the cargo storage compartment 106 with the attenuator member 102 in a default (e.g., unloaded) position. Upon deflection of the wings 150 (FIG. 2), distortion of the cargo storage compartment 106 may cause the attenuator member 102 and the cargo restraint 116 to move in a lateral direction, represented by directional arrow 190, for example, toward the cargo 124 to which the cargo restraint 116 is restraining.

As an example, upward deflection of the wings 150 (FIG. 2) may result in distortion of the cargo storage compartment 106 that causes the attenuator member 102 and the cargo restraint 116 to move in a lateral inboard direction. As another example, downward deflection of the wings 150 may result in distortion of the cargo storage compartment 106 that causes the attenuator member 102 and the cargo restraint 116 to move in a lateral outboard direction.

Because the attenuator member 102 is coupled to the attenuator support structures 184, which are coupled to or form a part of the structure of the cargo storage compartment 106, and the cargo restraint 116 is coupled to the attenuator member 102, the attenuator member 102, the cargo restraint 116 and the structure of the cargo storage compartment 106 act as a rigid body and move together in response to distortion of the cargo storage compartment 106.

FIG. 7 illustrates an example of the disclosed cargo restraint system 100 during distortion of the cargo storage compartment 106 with the attenuator member 102 in a deflected (e.g., loaded) position. During deflection of the wings 150 (FIG. 2), distortion of the cargo storage compartment 106 may cause the attenuator member 102 and the cargo restraint 116 to move in the lateral direction 190 (FIG. 6) until the cargo restraint 116 contacts the cargo 124. Contact between the cargo restraint 116 and the cargo 124 creates the lateral load 186 pushing back against the cargo restraint 116. Continued lateral displacement of the attenuator member 102 and the cargo restraint 116 increases the lateral load 186 acting on the cargo restraint 116 until the lateral load 186 produces sufficient force to overcome the inherent counter-force provided by the attenuator member 102, resulting in deflection of the attenuator member 102 in the opposing lateral direction 188. The attenuator member 102 continues to exert the counter-force such that when the force of the lateral load 186 created by the lateral displacement of the cargo restraint 116 subsides, the attenuator member 102 decompresses, returning the attenuator member 102 and the cargo restraint 116 to the default position (FIG. 6).

As an example, upward deflection of the wings 150 (FIG. 2) may result in distortion of the cargo storage compartment 106 that causes an outboard lateral load sufficient to deflect the attenuator member 102 in the lateral outboard direction. As another example, downward deflection of the wings 150 may result in distortion of the cargo storage compartment 106 that causes an inboard lateral load sufficient to deflect the attenuator member 102 in the lateral inboard direction.

FIG. 8 illustrates an example of the disclosed cargo restraint system 100 used with cargo 124 that is about half as wide as the cargo storage compartment 106. In this example, the side cargo restraint 116-2 is coupled to the attenuator member 102 and engages an outboard lower end of the cargo 124. The center cargo restraint 116-1 is coupled to the cargo deck 112 (e.g., to the track 158) opposite the side cargo restraint 116-2 and engages an inboard lower end of the cargo 124.

As an example, distortion of the cargo storage compartment 106 in response to upward deflection of the wings 150 (FIG. 3) may cause the side cargo restraint 116-2 to move in a lateral inboard direction. Lateral inboard displacement of the side cargo restraint 116-2 may pinch the cargo 124 between the side cargo restraint 116-2 and the center cargo restraint 116-1, which may transmit the undesirable lateral load 186 (FIG. 7) to the cargo storage compartment 106. In this example, when the lateral load 186 produces sufficient force to overcome the inherent counter-force provided by the attenuator member 102, the attenuator member 102 deflects in the lateral outboard direction to attenuate the lateral load 186 until the distortion of cargo storage compartment 106 and the force generated by the lateral load 186 subside.

FIG. 9 illustrates an example of the disclosed cargo restraint system 100 used with cargo 124 that is about as wide as the cargo storage compartment 106. In this example, a first (e.g., a port) side cargo restraint 116-2 is coupled to a first (e.g., a port) attenuator member 102 and engages a first (e.g., port) outboard lower end of the cargo 124. A second (e.g., starboard) side cargo restraint 116-2 is coupled to a second (e.g., starboard) attenuator member 102 opposite the first side cargo restraint 116-2 and engages a second (e.g., starboard) outboard lower end of the cargo 124.

As an example, distortion of the cargo storage compartment 106 in response to upward deflection of the wings 150 (FIG. 3) may cause the both side cargo restraints 116-2 to move in a lateral inboard direction. Lateral inboard displacement of the side cargo restraints 116-2 may pinch the cargo 124 between the side cargo restraints 116-2, which may transmit the undesirable lateral load 186 (FIG. 7) to the cargo storage compartment 106. In this example, when the lateral load 186 produces sufficient force to overcome the inherent counter-force provided by the attenuator members 102, each of the attenuator members 102 deflect in the lateral outboard direction to attenuate the lateral load 186 until the distortion of cargo storage compartment 106 and the force generated by the lateral load 186 subside.

Figure 10:
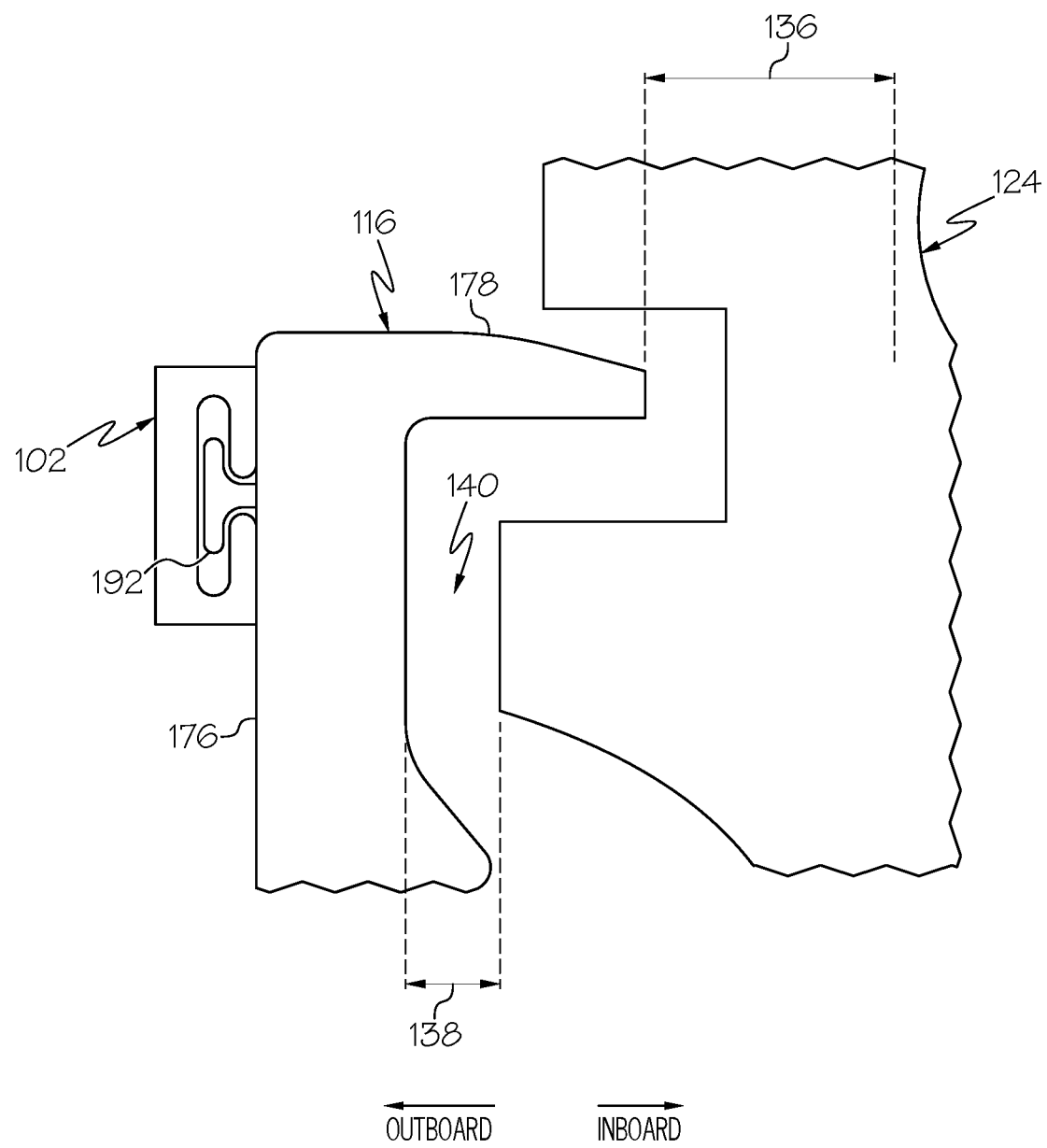
FIG. 10 is a schematic partial end elevation view of another example of the disclosed cargo restraint system.

Referring to FIG. 10, in an example, the cargo restraint 116 is configured to engage the cargo 124 loaded on the cargo deck 112 and is configured to vertically and laterally restrain the cargo 124 relative to the cargo deck 112. The cargo restraint 116 may have various structural features and/or configurations, for example, based on a particular type or design of cargo 124 (e.g., the ULD 152 or the pallet 154) (FIG. 1). As an example, and as best illustrated in FIGS. 8 and 9, the cargo restraint 116 is configured to engage a lower edge of the cargo 124.

In an example, the cargo restraint 116 includes a base 176 and a head 178 coupled to the base 176. The base 176 is configured to be coupled to the attenuator member 102. The head 178 is configured to engage the cargo 124. Engagement between the head 178 and the cargo 124 vertically and laterally restrains the cargo 124 relative to the cargo deck 112.

In certain examples, as best illustrated in FIG. 5, the base 176 is also configured to be coupled to the cargo deck 112 (e.g., the track 158). In an example, the base 176 includes an inboard end 180 and an opposed outboard end 182. The head 178 is located at the outboard end 182. The outboard end 182 of the base 176 is coupled to the attenuator member 102. The inboard end 180 of the base 176 is coupled to the cargo deck 112 (e.g., to the track 158).

Referring to FIG. 11, in an example, the attenuator member 102 includes an attachment zone 130 located between the two first attachment locations 104. The second attachment location 122 (FIGS. 4, 6 and 7), at which the cargo restraint 116 is coupled to the attenuator member 102, is selected to be within the attachment zone 130. In an example, the attachment zone 130 is defined by a region 132 of the attenuator member 102 capable of a minimum linear displacement dimension 134 (FIG. 7) in response to the lateral load 186 (FIG. 7) applied to the attenuator member 102 by the cargo restraint 116.

Referring to FIGS. 10 and 11, in an example, the minimum linear displacement dimension 134 (FIG. 7) of the attenuator member 102 is equal to or greater than a difference between a maximum linear displacement dimension 136 (FIG. 10) of the cargo restraint 116 and a linear dimension 138 (FIG. 10) of a gap 140 between the cargo restraint 116 and the cargo 124. The maximum linear displacement dimension 136 of the cargo restraint 116 is the maximum lateral displacement of the cargo restraint 116 in response to distortion of the cargo storage compartment 106 resulting from a maximum deflection of the wings 150.

Referring to FIG. 11, in an example, the attenuator member 102 includes an elongated unitary structure 142 that includes a base structure 144 and a connecting structure 146. The base structure 144 of the attenuator member 102 is formed from a stiff and resilient material having the capability of being deformed (e.g., bent) in response to a sufficient lateral load 186 (FIG. 7) and the capability of returning to its original shape after being deformed. The base structure 144 is configured to produce the counter-force acting against the displacement force of the lateral load 186. The inherent counter-force of the attenuator member 102 is defined by the stiffness of the attenuator member 102. For example, the stiffness of the attenuator member 102 may be controlled by at least one of the cross-sectional shape of the base structure 144 and the selected position of the second attachment location 122 (FIG. 5) within the attachment zone 130.

The connecting structure 146 of the attenuator member 102 is configured to enable removable and adjustable coupling of the cargo restraint 116 to the attenuator member 102. In an example, the connecting structure 146 of the attenuator member 102 includes alternating open fittings 164 and closed fittings 166. The open fittings 164 are configured (e.g., shaped and/or sized) to accept studs or other mounting hardware 192 (FIG. 10) of cargo restraints 116. The mounting hardware 192 of the cargo restraints 116 are inserted into the open fittings 164 at desired longitudinal locations along the attenuator member 102. The positions of the cargo restraints 116 are secured by sliding the cargo restraints 116 along the attenuator member 102 such that the mounting hardware 192 is aligned within the closed fittings 166 instead of the open fittings 164.

As an example, the attenuator member 102 is standardized track. As a specific example, the attenuator member is a seat track 148. In this example, the seat track 148 may be the same as the tracks 158 (FIG. 3) coupled to the cargo deck 112 for attachment of the cargo restraints 116 (e.g., the center cargo restraints 116-1 in FIG. 3).

Figure 12:
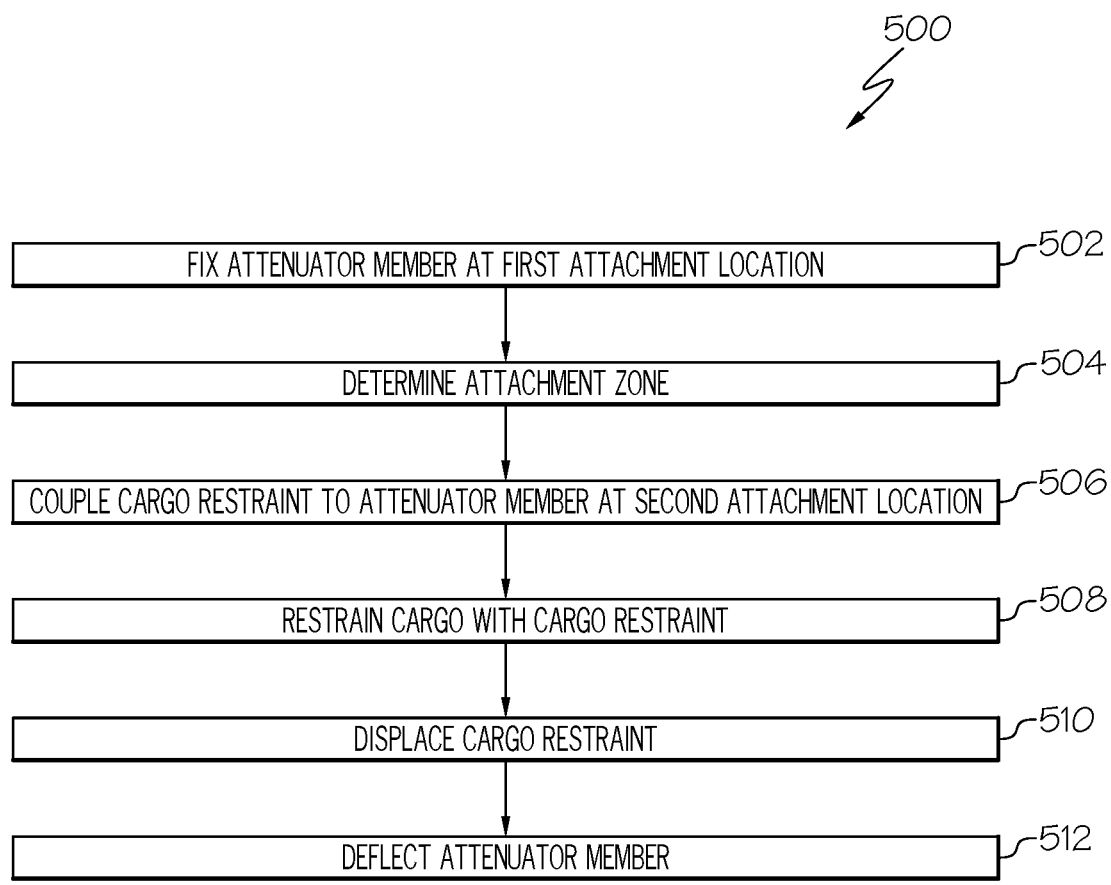
FIG. 12 is a flow diagram illustrating an example of the disclosed method for restraining cargo.

Referring to FIG. 12, also disclosed is a method 500 for restraining the cargo 124 within the cargo storage compartment 106 of the fuselage 108 of the aircraft 110. The method 500 is achieved utilizing the disclosed cargo restraint system 100.

Referring generally to FIGS. 4 and 5 and particularly to FIG. 12, in an example, the method 500 includes the step of fixing the attenuator member 102 at the two first attachment locations 104, as shown at block 502. As an example, the attenuator member 102 is coupled to two or more attenuator support structures 184 at two or more first attachment locations 104. Each first attachment location 104 of the attenuator member 102 is associated with one of the attenuator support structures 184.

Referring generally to FIGS. 5-11 and particularly to FIG. 12, in an example, the method 500 includes the step of determining the attachment zone 130 (FIG. 11) of the attenuator member 102, as shown at block 504. The attachment zone 130 includes a portion of the attenuator member 102 proximate to a center of the attenuator member 102 and extending outward in both directions toward the two first attachment locations 104 and terminating at a position spaced away from the two first attachment locations 104. Determination of the attachment zone 130 and selection of the second attachment location 122 (FIG. 5) within the attachment zone 130 may be an iterative process.

In an example, the step of determining the attachment zone 130 includes the step of identifying (e.g., measuring) the linear dimension 138 of the lateral gap 140 (FIG. 10) between the cargo restraint 116 and the cargo 124. In cases where there is a lateral gap 140 between the cargo 124 and the cargo restraints 116 on both opposed sides of the cargo 124, for example, as best illustrated in FIGS. 8 and 9, the linear dimension 138 is a total linear dimension of both lateral gaps 140, which is determined by adding together a first linear dimension 138 of a first lateral gap 140 between a first cargo restraint 116 and a first side of the cargo 124 and a second linear dimension 138 of a second lateral gap 140 between a second cargo restraint 116, opposite the first cargo restraint 116, and a second side of the cargo 124. The linear dimension 138 represents the lateral displacement available for free lateral movement of the cargo restraint 116 before contacting the cargo 124.

In an example, the step of determining the attachment zone 130 also includes the step of calculating the maximum linear displacement dimension 136 (FIG. 10) of the cargo restraint 116 caused by distortion of the cargo storage compartment 106 under maximum deflection of the wings 150 (FIG. 2).

In an example, the step of determining the attachment zone 130 also includes the step of determining if pinching will occur by comparing the linear dimension 138 (FIG. 10) to the maximum linear displacement dimension 136 (FIG. 10). When the linear dimension 138 is less than the maximum linear displacement dimension 136, pinching of the cargo 124 by the cargo restraints 116 will occur. When the linear dimension 138 is greater than the maximum linear displacement dimension 136, pinching of the cargo 124 by the cargo restraints 116 will not occur.

In an example, the step of determining the attachment zone 130 also includes the step of calculating the total pinching dimension by subtracting the linear dimension 138 is greater than the maximum linear displacement dimension 136.

In an example, the step of determining the attachment zone 130 also includes the step of designing the attenuator member 102 by modeling the attenuator member 102 as a continuous beam extending between and fixed to the two attenuator support structures 184 at the two first attachment locations 104 (FIG. 4) and applying a displacement to the attenuator member 102 equal to the total pinching dimension at various locations along the attenuator member 102 between the two first attachment locations 104.

In an example, the step of determining the attachment zone 130 also includes the step of calculating the reactions of the attenuator member 102 (e.g., the inherent counterforce provided by the attenuator member 102) in response to the displacement along the length of the attenuator member 102 between the two first attachment locations 104 and at the two attenuator support structures 184. This step may be repeated in an iterative manner by moving the location of the displacement of the attenuator member 102 from the approximate center of the attenuator member 102 toward the attenuator support structures 184. The attachment zone 130 is limited to the region 132 (FIG. 11) of the attenuator member 102 that includes locations where the reactions of the attenuator member 102 are less than the ultimate lateral load 186 (FIG. 7) applied to the attenuator member 102. Accordingly, the attachment zone 130 includes locations on the attenuator member 102 that are capable of the minimum linear displacement dimension 134 (FIG. 7) of lateral displacement upon deflection of the attenuator member 102 in response to application of the lateral load 186 (FIG. 7) that is equal to or greater than the total pinching dimension.

Referring generally to FIGS. 4 and 11 and particularly to FIG. 12, the method 500 also includes the step of selectively coupling the cargo restraint 116 to the attenuator member 102 at the second attachment location 122 of the attenuator member 102, located between the two first attachment locations 104, as shown at block 506. As an example, the second attachment location 122 is selected within the attachment zone 130 of the attenuator member 102.

Referring generally to FIGS. 8-10 and particularly to FIG. 12, the method 500 also includes the step of restraining the cargo 124 with the cargo restraint 116, as shown at block 508. In an example, at least one opposing pair of cargo restraints 116 vertically restrain and laterally restrain the cargo 124 relative to the cargo deck 112.

Referring generally to FIGS. 6 and 7 and particularly to FIG. 12, the method 500 also includes the step of displacing the cargo restraint 116 in response to distortion of the cargo storage compartment 106, as shown at block 510. Distortion of the cargo storage compartment 106 and, thus, lateral displacement of the cargo restraint 116 is in response to (results from) deflection of the wings 150 of the aircraft 110. In an example, distortion of the cargo storage compartment 106 and, thus, lateral inboard displacement of the cargo restraint 116 is in response to an upward deflection of the wings 150 of the aircraft 110 (FIG. 2). In another example, distortion of the cargo storage compartment 106 and, thus, lateral outboard displacement of the cargo restraint 116 is in response to a downward deflection of the wings 150 of the aircraft 110.

Referring generally to FIGS. 6 and 7 and particularly to FIG. 12, the method 500 also includes the step of deflecting the attenuator member 102 in response to the lateral load 186 (FIG. 7) applied to the attenuator member 102 through the cargo restraint 116, as shown at block 512. The lateral load 186 is created due to contact between the cargo restraint 116 and the cargo 124 and continued lateral displacement of the cargo restraint 116.

Figure 13:
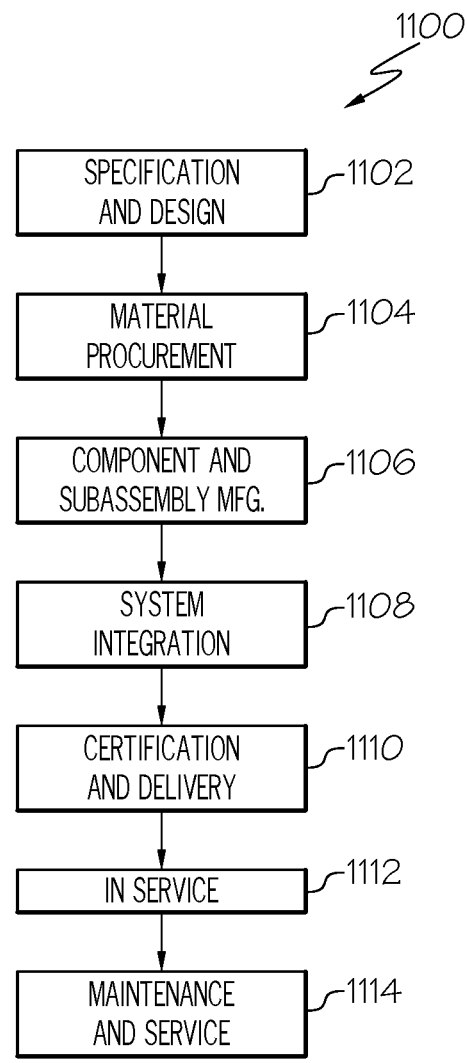
FIG. 13 is a flow diagram of an example aircraft production and service methodology.
Figure 14:
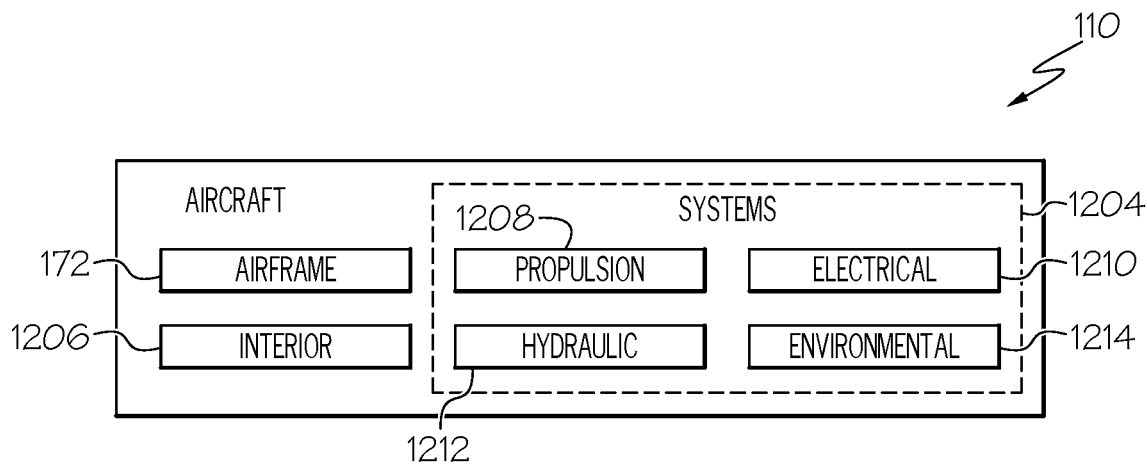
FIG. 14 is a schematic block diagram of another example of the aircraft.

Examples of the system 100 and the method 500 disclosed herein may find use in a variety of potential applications, particularly in the transportation industry, including for example, aerospace applications. Referring now to FIGS. 12 and 13, examples of the system 100 and method 500 may be used in the context of an aircraft manufacturing and service method 1100, as shown in the flow diagram of FIG. 13, and the aircraft 110, as shown in FIG. 14. Aircraft applications of the disclosed examples may include restraining cargo 124 within the cargo storage compartment 106 of the fuselage 108 of the aircraft 110.

As shown in FIG. 13, during pre-production, the illustrative method 1100 may include specification and design of aircraft 110, as shown at block 1102, and material procurement, as shown at block 1104. During production of the aircraft 110, component and subassembly manufacturing, as shown at block 1106, and system integration, as shown at block 1108, of the aircraft 110 may take place. Thereafter, the aircraft 110 may go through certification and delivery, as shown at block 1110, to be placed in service, as shown at block 1112. The disclosed cargo restraint system 100 may be designed and installed as a portion of component and subassembly manufacturing (block 1106) and/or system integration (block 1108). While in service, the disclosed method 500 may be achieved utilizing the cargo restraint system 100 to restrain the cargo 124 within the cargo storage compartment 106 of the fuselage 108 of the aircraft 110. Routine maintenance and service may include modification, reconfiguration, refurbishment, etc. of one or more systems of the aircraft 110.

Each of the processes of illustrative method may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, the aircraft 110 produced by the illustrative method may include the airframe 172, a plurality of high-level systems 1204 and an interior 1206, for example, that includes the cargo storage compartment 106 having the cargo restraint system 100. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

Examples of the system and method shown or described herein may be employed during any one or more of the stages of the aircraft manufacturing and service method 1100 shown in the flow diagram. For example, components or subassemblies corresponding to component and subassembly manufacturing (block 1106) may be fabricated or manufactured in a manner similar to components or subassemblies produced while the aircraft 110 is in service (block 1112). Also, one or more examples of the system, method or combination thereof may be utilized during production stages (blocks 1108 and 1110). Similarly, one or more examples of the system, method or a combination thereof, may be utilized, for example and without limitation, while the aircraft 110 is in service (block 1112) and during maintenance and service stage (block 1114).

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

In FIGS. 12 and 13, referred to above, the blocks may represent operations and/or portions thereof and lines connecting the various blocks do not imply any particular order or dependency of the operations or portions thereof. It will be understood that not all dependencies among the various disclosed operations are necessarily represented. FIGS. 12 and 13 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed system and method have been shown and described, modifications may occur to those skilled in the art upon reading the specification. The present application includes such modifications and is limited only by the scope of the claims.

What is claimed is:

1. An aircraft cargo restraint system comprising:
an attenuator member having a longitudinal axis and fixed at two first attachment locations along said longitudinal axis of said attenuator member within a cargo storage compartment of a fuselage of an aircraft; and
a cargo restraint configured to be coupled to said attenuator member at a second attachment location of said attenuator member, located between said two first attachment locations, wherein:
said cargo restraint is configured to restrain cargo loaded on a cargo deck of said cargo storage compartment; and
said attenuator member is configured to deflect in a direction perpendicular to said longitudinal axis of said attenuator member in response to a load applied to said attenuator member by said cargo restraint.

2. The system of claim 1, wherein:
said attenuator member is oriented in a first direction substantially parallel to a longitudinal axis of said fuselage; and
said cargo restraint is oriented in a second direction substantially perpendicular to said longitudinal axis of said fuselage to laterally restrain said cargo.

3. The system of claim 2, wherein said attenuator member is configured to deflect in a lateral direction in response to a lateral load applied to said attenuator member by said cargo restraint.

4. The system of claim 1, wherein said attenuator member is positioned adjacent to said cargo deck of said cargo storage compartment.

5. The system of claim 1, wherein:
said attenuator member is coupled with two frame sections of said fuselage at said two first attachment locations; and
said attenuator member extends between said two frame sections.

6. The system of claim 5, wherein said two frame sections are part of a wing center section of said fuselage to which wings of said aircraft are coupled.

7. The system of claim 1, wherein:
said attenuator member comprises an attachment zone located between said two first attachment locations; and
said second attachment location, at which said cargo restraint is coupled to said attenuator member, is selected to be within said attachment zone.

8. The system of claim 7, wherein said attachment zone is defined by a region of said attenuator member capable of a minimum linear displacement dimension in response to said load applied to said attenuator member by said cargo restraint.

9. The system of claim 8, wherein said minimum linear displacement dimension of said attenuator member is equal to or greater than a difference between a maximum linear displacement dimension of said cargo restraint and a linear dimension of a gap between said cargo restraint and said cargo.

10. The system of claim 1, wherein said attenuator member comprises an elongated unitary structure comprising a base structure and a connecting structure.

11. The system of claim 1, wherein said attenuator member comprises a seat track.

12. An aircraft comprising:
a fuselage comprising a cargo storage compartment; and
an aircraft cargo restraint system configured to restrain cargo within said cargo storage compartment, said aircraft cargo restraint system comprising:
an attenuator member having a longitudinal axis and fixed at two first attachment locations along said longitudinal axis of said attenuator member within said cargo storage compartment; and
a cargo restraint configured to be coupled to said attenuator member at a second attachment location of said attenuator member, located between said two first attachment locations, wherein:
said cargo restraint is configured to restrain said cargo loaded on a cargo deck of said cargo storage compartment; and
said attenuator member is configured to deflect in a direction perpendicular to said longitudinal axis of said attenuator member in response to a load applied to said attenuator member by said cargo restraint.

13. The aircraft of claim 12, wherein:
said attenuator member is positioned adjacent to said cargo deck of said cargo storage compartment;

said attenuator member is oriented in a first direction substantially parallel to a longitudinal axis of said fuselage; and said cargo restraint is oriented in a second direction substantially perpendicular to said longitudinal axis of said fuselage.

14. The aircraft of claim 13, wherein:

said fuselage further comprises a plurality of frame sections;

said attenuator member is coupled with two of said plurality of frame sections at said two first attachment locations; and said attenuator member extends between said two of said plurality of frame sections.

15. The aircraft of claim 14, wherein said two of said plurality of frame sections partially form a wing center section of said fuselage to which wings of said aircraft are coupled.

16. The aircraft of claim 12, wherein:

said attenuator member comprises an attachment zone located between said two first attachment locations; and said second attachment location, at which said cargo restraint is coupled to said attenuator member, is selected to be within said attachment zone.

17. The aircraft of claim 16, wherein said attachment zone is defined by a region of said attenuator member capable of a minimum linear displacement dimension in response to said load applied to said attenuator member by said cargo restraint.

18. The aircraft of claim 17, wherein said minimum linear displacement dimension of said attenuator member is equal to or greater than a difference between a maximum linear displacement dimension of said cargo restraint and a linear dimension of a gap between said cargo restraint and said cargo.

19. A method for restraining cargo within a cargo storage compartment of a fuselage of an aircraft, said method comprising:

fixing an attenuator member, having a longitudinal axis, at two first attachment locations along said longitudinal axis of said attenuator member;

selectively coupling a cargo restraint to said attenuator member at a second attachment location of said attenuator member, located between said two first attachment locations;

restraining said cargo with said cargo restraint;

displacing said cargo restraint in response to distortion of said cargo storage compartment; and deflecting said attenuator member in a direction perpendicular to said longitudinal axis of said attenuator member in response to a load applied to said attenuator member through said cargo restraint.

20. The method of claim 19, wherein said displacement of said cargo restraint is in response to an upward deflection of wings of said aircraft.

* * * * *